Sept. 22, 1959 D. G. AID 2,905,926
AUTOMATIC CHARGING SYSTEM
Filed Jan. 28, 1954 5 Sheets-Sheet 4
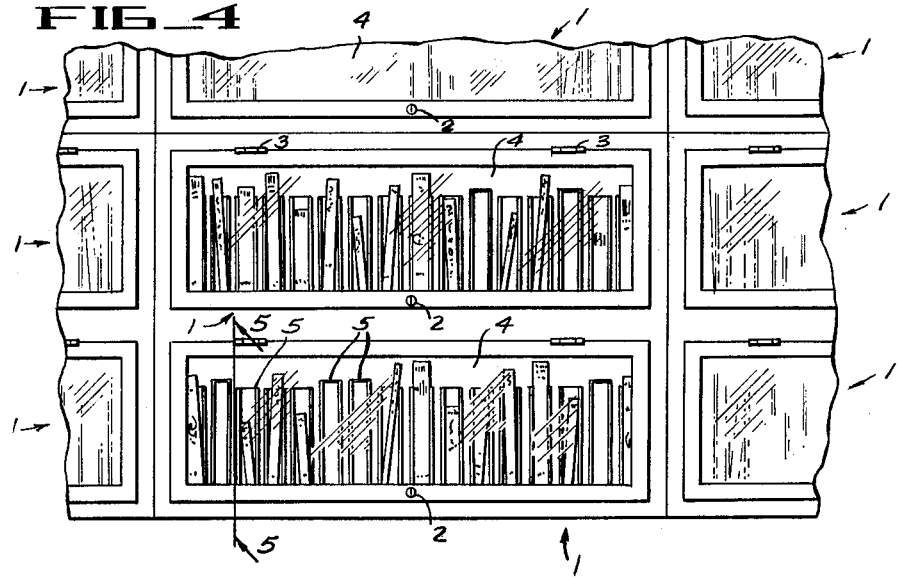
FIG_4
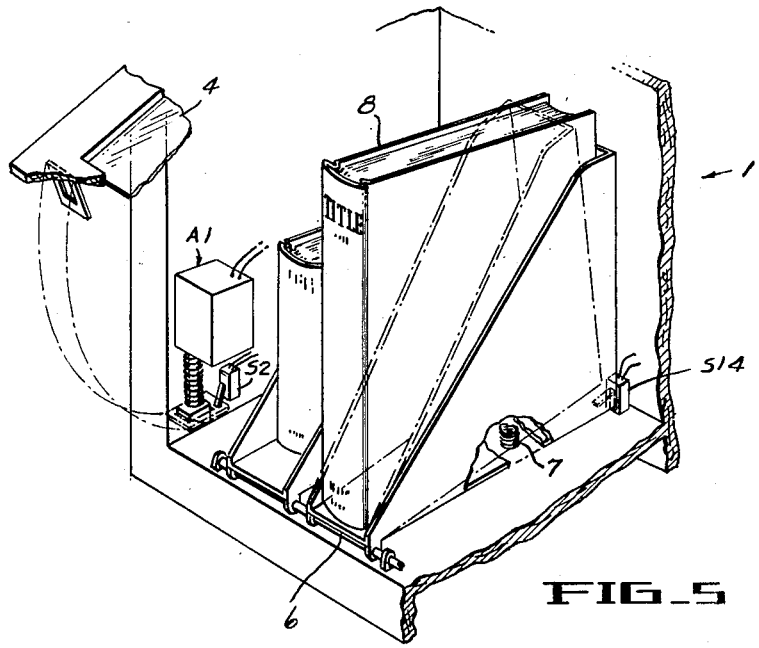
FIG_5
INVENTOR.
DOUGLAS G. AID
BY
Boyken, Mohler & Beckley
ATTORNEYS Sept. 22, 1959 D. G. AID 2,905,926
AUTOMATIC CHARGING SYSTEM
Filed Jan. 28, 1954 5 Sheets-Sheet 5
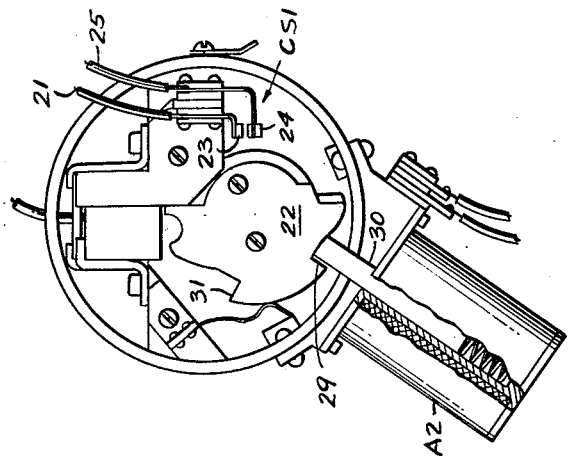
FIG_7
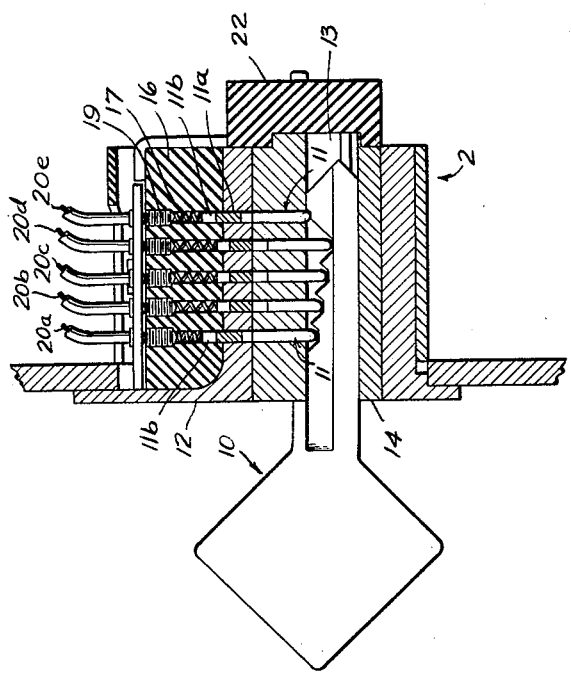
FIG_6
INVENTOR.
DOUGLAS G. AID
BY
Boyken, Mohler & Beckley
ATTORNEYS

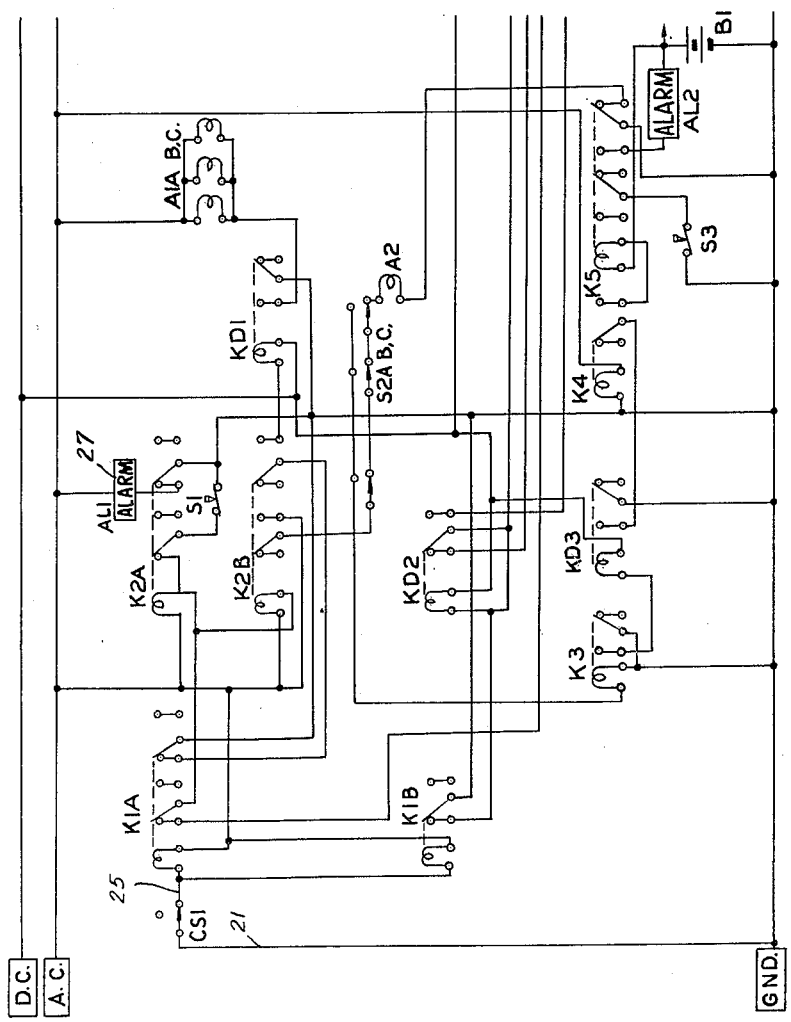

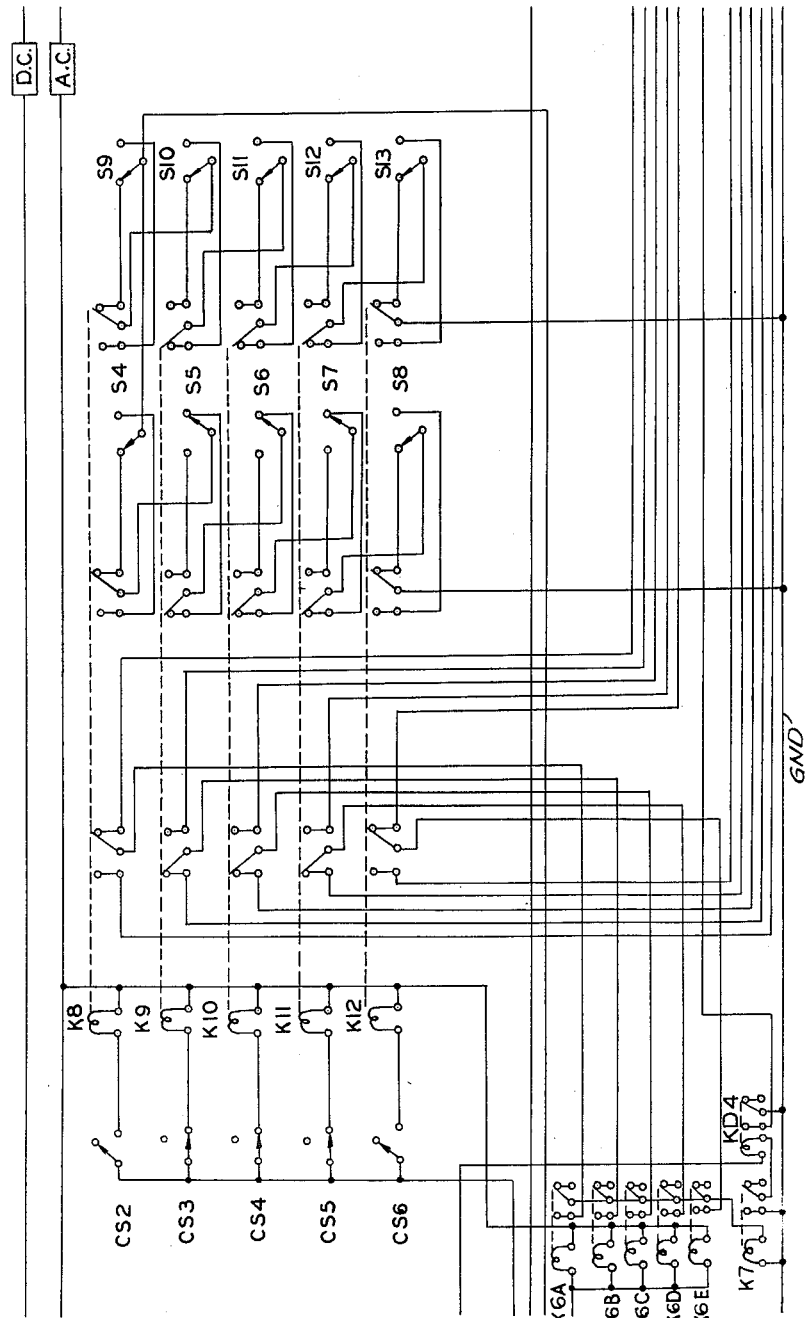

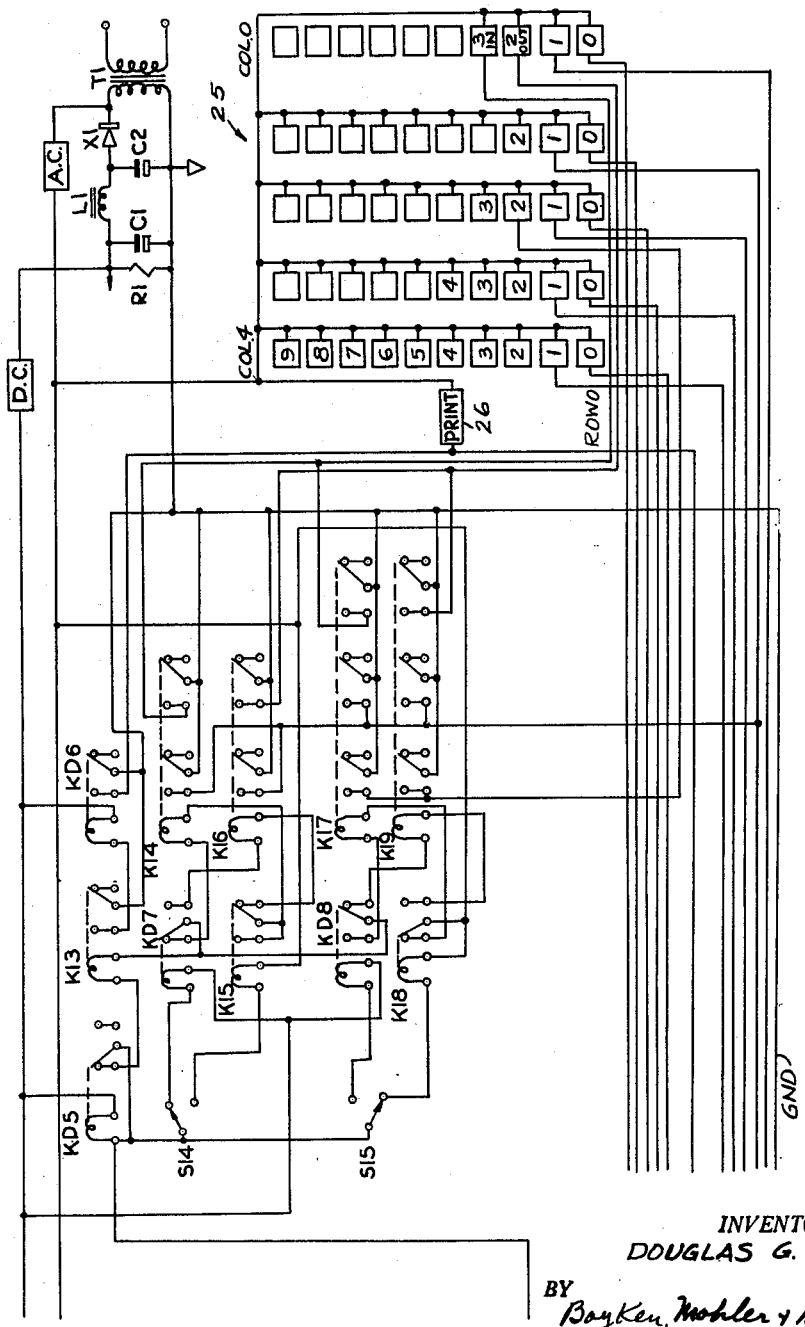

United States Patent Office 2,905,926
Patented Sept. 22, 1959

2,905,926

AUTOMATIC CHARGING SYSTEM

Douglas G. Aid, Menlo Park, Calif.

Application January 28, 1954, Serial No. 406,866

7 Claims. (Cl. 340—147)

This invention relates to an automatic charging system by which a selected number of persons may be permitted access to or use of certain items or functions so that such access or use may be automatically charged to the appropriate person.

One specific example of the invention would be a library from which books may be removed only by subscribers having a coded key and provided with means for automatically charging such subscriber with the book or books removed. Such a system obviates the need for a paid librarian.

Another example of the invention would be a store or the like having goods protected by locks and to which access may be had by customers provided with a properly coded key. In such a case removal of an item from its stored position would automatically charge the customer with the goods and make a permanent record of the same.

Still another example might be an apparatus which performs a function rather than providing articles adapted to be removed. In such a case the performance of the function could be effected only by an authorized user having a personally coded card, key or the like.

In all of the above cases a system is provided in which a plurality of articles are subject to being, at any one time, in one of two conditions. Thus, in the case of a library, a book is either in place or removed therefrom. In the case of a device for performing a function, it is either performing or not performing it.

The main object of the present invention is the provision of a charging system and apparatus by which subscribers or customers may automatically be charged with the responsibility of effecting a change in a plurality of articles having, at any time, one of two conditions.

Another object of the invention is the provision of an automatic charging system subject to use by persons each having a certain code so that the use of the system and the extent of such use may be recorded automatically without the necessity of having personnel in attendance.

Still another object of the invention is the provision of an automatic charging system for a library or the like in which a permanent printed record is automatically made of the identity of the user of the system and the exact extent of such use.

Yet another object of the invention is the provision of an automatic charging system for a library or the like which is foolproof in operation and not subject to breakdown due to power failure and having provision for preventing unauthorized use of the same.

Other objects and advantages will be seen from the following specification and drawings.

Figs. 1–3 are wiring diagrams which are expanded into three portions because of space limitations.

Fig. 4 is a fragmentary front elevational view of a group of library cabinets showing one embodiment of the invention.

Fig. 5 is a cross sectional view of the cabinet taken along lines 5—5 of Fig. 4 showing an individual bay adapted to contain a book and showing the cabinet lock release and limit switch.

Fig. 6 is a longitudinal cross sectional view through the lock of the present invention.

Fig. 7 is an end elevational view of the lock structure.

*Compartments*

In detail, the invention comprises a plurality of bays, receptacles, or other articles which are adapted to have, at any one time, one of two conditions. Although the present invention will be described with reference to a library in which each article is a bay for containing an item such as a book, it will be understood that the present invention is broader than this in scope. In the case of the bays to be described, the same are contemplated as being, at any one time, either empty or filled—these being the two conditions with which the invention is primarily concerned. However, it will be understood that the articles involved need not necessarily have contents which are adapted to be removed and replaced but may be devices for performing a function, for example. In the latter case, broadly speaking, the states of either performing or not performing a function or service may be considered to be the two conditions involved. Some examples of the above are automatic filling station pumps, vending machines, roadside weighing machines, automatic ticket dispensers and the like.

In the specific illustration shown in Fig. 4 a plurality of compartments each generally designated 1 are provided, each having a key operated lock 2 and hinges 3. For convenience in viewing the contents of the compartments the latter are provided with glass fronts 4.

In the drawings, each cabinet 1 contains a pluarity of book receiving bays 5 the condition of which is subject to change, either by having a book removed therefrom or replaced therein. However, it will be apparent that each cabinet may contain only one bay if desired, the only reason for grouping a plurality of bays in one compartment being economy. It will be apparent that the steps of unlocking one of the cabinets 1 and removing a book from a bay 5 are the same regardless of whether there is one or many bays 5 accessible by unlocking a cabinet. In other words to remove a book it is necessary to unlock a bay regardless of whether this step involves unlocking adjoining bays.

Each bay 5 may be made of sheet metal or the like and is hingedly supported at its outer or open end as indicated at 6 (Fig. 5).

Each bay is urged upwardly at all times as by a spring 7 which is adapted to be compressed by the weight of a book 8 or other article when the latter is in the bay.

At the end of the bay illustrated and opposite the hinge 6 is a switch, herein designated S14, which may be of the snap action double throw type, and which is adapted to be actuated when a book is removed or replaced. As will be seen later on when the wiring diagram is considered, the switch S14 is adapted to close different circuits depending on whether it is up or down. Switch S14 is of the spring loaded type so that it returns to the up position with the bay when the contents are removed.

The locks 2 on the cabinet 1 are adapted to be actuated by a key, generally designated 10 (Fig. 6) which is in many respects similar to a conventional key for a pin tumbler lock. In other words, the key 10 is provided along its length with a plurality of cuts or indentations which are adapted to be engaged by pin tumblers 11 (Fig. 6). The pins 11 are radially slidable within a cylinder 12 and intersect a central rotatable core 14 in which is formed the usual keyway 13 for receiving key 10.

It will be understood that in normal practice each pin tumbler 11 is made up of two or more segments so that when the correct key is fitted within keyway 13 the junctures between the various segments of the pin tumblers coincide with the periphery of the core 14 and therefore permit rotation of the latter.

In addition to the conventional structure above noted, the present invention contemplates the incorporation of an additional function in the pin tumblers 11. This novel function is the utilization of the pin tumblers to register a code corresponding to the particular key employed.

To provide for this latter function, each pin tumbler includes a section 11a (cross hatched in Fig. 6) which is formed of insulated material. In addition to the usual cylinder 12 in which the core 14 is rotatable, there is provided an insulated block 16 secured to the lock cylinder and formed with bores for receiving the pin tumbler sections therein. It is therefore seen that the block 16, the cylinder 12 and the plug 14 are provided with aligned bores for receiving the pin tumblers 11.

Outwardly of the insulated segments 11a are segments 11b of conductive material similar to the segments of the pin tumblers 11 that engage the key 10.

Urging the pin tumblers 11 radially inwardly relative to the core 14 are the usual springs 17 which engage the segments 11b at one of their corresponding ends and which are in contact at their opposite ends with set screws, screw-threadedly received in the block 16 (Fig. 6). To set screws 19 are connected wires 20a—20e for a purpose to be described.

At this point it will be noted that if a circuit is effected which includes the cylinder 12 and the lead 20a, said circuit may be completed or opened depending upon the position of the corresponding insulated segment 11a. Thus in Fig. 6 it is seen that the circuits which include leads 20b, 20c and 20d are completed whereas the circuits which include leads 20a and 20e are opened.

Secured to the end of core 14 of lock 2 is a cam 22 made of nonconducting material which, upon rotation of core 14 is adapted to move an insulated contact 24, to which a lead 25 is secured, into engagement with an insulated contact 23 to which a lead 21 is secured. The switch thus effected is designated CS1 in the wiring diagram Fig. 1.

At this point it will be noted that when the key 10 is inserted into the lock 2 the pin tumblers move so as to complete or interrupt circuits thus constituting switches which are designated CS2 to CS6 in Fig. 2 of the wiring diagram. When the lock core 14 is rotated switch CS1, comprising contacts 23, 24, is closed so as to energize certain circuits which will subsequently be described in connection with wiring diagram.

*Wiring diagram*

With reference to the wiring diagram of Figs. 1, 2 and 3 it is seen that power is supplied by both A.C. and D.C. busses, the D.C. power being derived in the usual manner from A.C. mains by means of a transformer, rectifier, filter and bleeder.

As noted above, the coding switches CS2 to CS6 are opened and closed by insertion of the key 10 in the lock 2 thus providing a means directly responsive to the code of the user who has custody of the key. By way of example said coding switches are shown in Fig. 2 actuated by a code numeral "01110." It will be understood that by employing a five digit binary code a total of thirty-one different users may be provided for. Obviously by increasing the number of cuts or indentations in the key 10 the number of different possible users may be considerably increased. For example, both longitudinally extending edges of the key may be formed with cuts or indentations to considerably increase the number of permutations available. It will be noted that the switches CS2 to CS6 must, at any time, be in an open (0) or closed (1) position.

Upon rotation of the lock core to close switch CS1 a relay designated K1 is energized by completing the circuit between ground and the A.C. bus (Fig. 1). Relay K1 is of the three pole double throw type in which the armature reacts instantly upon energizing the coil. In Fig. 1 relay K1 is shown as comprising two coils, one actuating two sections and designated K1A and the other actuating one section and designated K1B. In connection with the disclosure of relays herein, closed sections will be indicated with their armatures swung to the left, or toward the coil and open sections with their armatures swung to the right. Thus, with the switch CS1 closed as shown in Fig. 1 all three sections of relay K1 are closed. When a relay has more than one section the sections are consecutively numbered starting with the one shown closest to the coil. In the drawings, relays are indicated by the letter K and delayed acting relays by the letters KD.

When relay K1B closes in response to the closing of switch CS1 the effect is to complete circuits from the A.C. main through switches CS2 to CS6 by grounding the latter through relay K1B (closed) as seen in Figs. 1, 2; only switches CS2, CS3 and CS4 being actually closed in the illustrative example shown.

Between the A.C. bus and switches CS2 to CS6 are relays K8 to K12 respectively, any combination of which may be energized depending on whether switches CS2 to CS8 are open or closed. These relays are adapted to actuate a register, schematically shown in Fig. 3 and described as follows.

*Register*

Inasmuch as electrically actuated register keyboards are old and no claim is made to such devices per se, the present description will allude only to a register schematically and it will be understood that each printing character is disposed for printing by energizing an associated coil which effects movement of the character in any of the usual ways.

By the present invention the register generally designated 25 (Fig. 3) comprises five spaced columns (0 to 4) of actuators arranged in a plurality of rows (0–9). Referring to Figs. 2, 3 it will be apparent that when the switches CS3, CS4 and CS5 are closed as above described, relays K9, K10 and K11 will be actuated to close the associated switches of section one of said relays. This results in the coils of the register actuators of columns 1, 2, 3, row 0 being actuated in a manner that will now be described.

As seen in Fig. 1 the closing of relay K1 energizes a relay designated KD2 designed to close after a time delay which, for purposes of the present invention, may be taken as two units of time; one unit being assumed to be time required to actuate the register actuators.

Before the closing of relay KD2 occurs, the actuators for the register keyboard are energized through another relay K6 which is energized as follows: Ground, K1B (closed), KD2 (open), K6 coils, A.C. bus. In other words, simultaneously with the closing of switch CS1 (corresponding to the opening of the compartment) relay K6 actuates the register to arrange numerals in the keyboard as follows:

Ground, K7 coil, K6A closed, K8 section 1 open, column 0 row 0 actuator coil, A.C. bus.

Ground, K7 coil, K6B closed, K9 section 1 closed, column 1 row 1 actuator coil, A.C. bus.

Following the above through all five columns of the register it will be seen that the actuators corresponding to the code "01110" are energized.

Simultaneously with the flow of current through the register keyboard actuators, another instantaneously closing coil K7 is energized which in turn energizes the coil of a delayed closing relay KD4. The latter is adapted to delay in closing for one unit of time.

From the above it will be apparent that before relay KD2 (which has a closing delay of two units) closes, the relay KD4 (one unit closing time delay) will close.

Connected with the delayed closing relay KD4 is the coil for energizing the print bar actuator generally designated 26 (Fig. 3). Upon energizing the actuator 26, the register prints whatever characters have been arranged for printing by the register actuators. Thus, one unit of the time after the switch CS1 closes to arrange the printing characters on the register 25, the relay KD4 closes and completes the following circuit: Ground, KD4 closed, printing actuator coil 26, A.C. bus.

In the above manner the code "01110" is printed on the printing tape indicating that the user of said code has opened a compartment.

One unit of time after the printing actuator coil is energized, relay KD2 closes with the following results:

The ground connection to relay K6 is interrupted and said relay opens instantly. The register keyboard is decoded and relay K7 opens instantly. The printing actuator 26 is deenergized thus setting the paper tape for the next operation.

The closing of relay KD2 initiates the steps which effectuate the monitoring of all of the bays 5. This procedure will now be described.

*Monitoring of bay contents*

As seen in Fig. 3 of the wiring diagram and as noted above in the description of the bays 5 a switch is provided for each bay which, when depressed indicates that the particular bay is filled and when elevated indicates that the contents have been removed. Thus, as seen in Fig. 3, switch S14 is in an "up" position indicating that the contents of its associated bay have been removed and switch S15 is depressed indicating that the corresponding bay is filled. Although the operation of only two bays will be described it will be understood that the same operation will obtain regardless of the number of bays.

Referring to the wiring diagram, when relay KD2 closes a closing time delay relay KD5 is energized in the following circuit: Ground, K1B closed, KD2 closed, KD5 coil, D.C. bus. This relay KD5 remains open and does not close for 3 units of time.

Simultaneously, computers are alerted in a manner to be described for registering any change in condition of the bays. In Fig. 3 only bay No. 1 and bay No. 21 are illustrated but it will be understood that additional apparatus required for other bays will operate in a manner similar to those now to be described.

Instantaneously with the energizing of delayed closing relay KD5 the computer for bay 1 is alerted by energizing a delayed opening and closing relay KD7 through the following circuit: Ground, K1B closed, KD2 closed, S14 out, KD7 coil, D.C. bus.

At the same time an instantaneously acting relay K18 is energized for alerting the computer of bay 21 through the following circuit: Ground, K1B closed, KD2 closed, S15 in, K18 coil, A.C. bus.

From the above, it will be apparent that the bay contents computer will remain in the above state until a change is made in the position of the bay switches.

If, for example, material is inserted in the empty bay No. 1, the following occurs:

Relay K15, which is instantaneous closing and opening, is energized through circuit: Ground, K1B closed, KD2 closed, S14 in, K15 coil, A.C. bus. Simultaneously, delayed opening and closing relay KD7 is deenergized at switch S14 but remains closed for two units of time.

At the same time instantaneously acting relay K14 is energized through the circuit: Ground, K1B closed, KD2 closed, KD5 closed, K13 coil, KD7 closed, K14 coil, K15 closed, A.C. bus.

The insertion of material in bay No. 1 results in the actuation of the keyboard actuators of the register so that the coil of actuators of row 3, column 0 and row 1 column 1 are energized so that the legend "13" may be printed, in this case the numeral "1" refers to the number of the bay and the numeral "3" has the significance of "in." As will be seen subsequently, the numeral "2" of column 0 has the significance of "out."

The actuator of column 0, row 3 is energized by completion of the following circuit: Ground, K14 section 2 closed, column 0 row 3 actuator coil, A.C. bus.

The actuation of column 1 row 1 is effected by actuation of the following circuit: Ground, K14 section 1 closed, column 1 row 1 actuator coil, A.C. bus.

Simultaneously, when current is drawn to energize the coil of relay K14, instantaneously acting relay K13 is closed energizing the coil of delayed closing relay KD6 which is delayed one unit of time in closing. This delay is to permit the register to become properly oriented before printing. Upon closing of relay KD6 the printing is accomplished by completion of the circuit: Ground, KD6 closed, print actuator coil, A.C. bus.

Inasmuch as relay KD7 remains closed for two units of time after its coil is deenergized, the same opens one unit of time after the tape is printed with "13" thereby deenergizing relay K14 and instantaneously deenergizing the register keyboard actuators.

The print actuator is, at the same time, deenergized, since no current is drawn by relay K14 through relay K13. The deenergizing of the latter causing relay KD6 to open instantly removing the ground from the print actuator. The register automatically sets the paper for the next operation.

At this point it should be noted that the register strip shows the following:

01110
13

This signifies that material has been returned to bay number one by a user having code number 01110.

If material is removed from bay 21, the following events occur:

(a) Instantaneously acting relay K18 is deenergized by the raising of switch S15.

(b) Delayed closing relay KD8, having a closing delay of two units, is energized through switch 15 but, of course, remains open for two units of time.

(c) While relay KD8 remains open, an instantaneously acting relay K19 is energized through the circuit: Ground, K1B closed, KD2 closed, KD5 closed, K13 coil KD8 open, K19 coil, K18 open, A.C. bus.

(d) Upon closing of relay K19, it is seen that the three sections of said relay ground the register keyboard actuator coils corresponding to the numeral "212." This signifies that the contents of bay 21 have been removed, the right hand digit "2" having the significance of "out."

(e) Inasmuch as the coil of relay K13 is in series with the coil of relay K19 it will be apparent that relay K13 will be closed simultaneously with the closing of relay K19, thus energizing the relay KD6 which has a delayed closing time of 1 unit. After relay KD6 closes the printing step takes place as above described.

(f) One unit of time later, relay KD8 closes deenergizing relays K19, K13 and the register actuators. Also the printing actuator is deenergized which causes the paper to be reset for the following operation.

It will be apparent that the above described operations may be readily extended to provide for additional columns in the register. Thus, although double pole double throw relays, such as K14, K16 may be used for bays 0–9, three pole double throw relays are required for bays 10 through 99 inclusive (i.e. K17, K19 for bay 21). Similarly, four pole double throw relays are required for bays 100 through 999 inclusive.

It should be noted that the customer coding number (such as 01110) is a five digit binary number and is therefore not readily confused with the bay codes.

In carrying out the above described charging operation, the actual mechanical release of the cabinets to permit the same to be swung open is permitted through lock release solenoids as indicated in the wiring diagram (Fig.

1) and in Fig. 5. The lock release solenoids A1 are normally deenergized thus locking the cabinet in closed position. However, when the coding switch CS1 is closed a delayed closing relay KD1 is energized so as to energize the lock release solenoids A1 after 5 units of time.

The circuit for accomplishing the unlocking of the cabinets is as follows: Ground, K1A section 2 closed, K2B section 2 open, KD1 coil, D.C. After five units of time relay KD1 closes energizing the lock release solenoids through the circuit: Ground, KD1 closed, solenoid coils A1A, A1B, A1C etc., A.C. bus.

Key monitor

Provision is made to prevent access to the system by keys which have been lost by the original customers or subscribers.

Referring to Fig. 2, a plurality of switch banks are provided so as to permit the same to be set in accordance with the code of a key which has been reported to the custodian as being lost. In Fig. 2, switches S4 to S8 inclusive comprise one bank or key monitor and switches S9 to S13 inclusive comprise another. Obviously any number of such banks may be provided depending upon the size of the system and the likelihood of the keys being lost.

If it is assumed that the key bearing the code 01110 has been lost, the custodian sets switches S4 and S8 at "0" position and switches S5, S6, S7 at "1" position.

Also provided is an alarm AL1 of any suitable type which, when energized, notifies the custodian that improper use of a key is being made. The alarm AL1 is energized by completing a circuit between the A.C. bus and ground through an alarm holding relay K2. Relay K2 is of the four pole double throw type and is shown in Fig. 1 as divided into two parts, K2A and K2B. The circuit through the alarm 27 is completed through section two of K2A.

When a key is inserted in a cabinet lock with the bank of switches S4—S8 set for the code of such key, a ground to the alarm holding relay K2 is applied through the following circuit using the code 01110 as an example: Ground, K12 section 2 open, S8 (position 0), K11 section 2 closed, S7 (position 1), K10 section 2 closed, S6 (position 1), K9 section 2 closed, S5 (position 1), K8 section 2 open, S4 (position 0), K1A section 1 closed, K2 coil, A.C. bus. K2 closes instantly and is held closed by a ground applied through K2A section 1 closed, even if the actuating ground through the bank of switches constituting the key monitor is removed.

Simultaneously with the energizing of alarm AL1 through relay K2A section 2 closed, ground is removed from lock release relay KD1. Inasmuch as relay KD1 has a closing time delay of 5 units the same is energized during the above described operation but is quickly deenergized before the expiration of the 5 units so that the lock release relays A1A, A1B, A1C etc. are not energized, thus preventing opening of the cabinet.

Interlocks

Referring again to Fig. 7, as described above the turning of the lock core results in the integrally connected cam 22 turning therewith so as to close the switch S1 which is constituted by contacts 23, 24. The cam 22 is shaped to provide a shoulder 29 which is adapted to engage the plunger 30 of a solenoid A2 (Fig. 2) when the latter is deenergized and plunger 30 is projected. As can be clearly seen in Fig. 7 rotation of the cam 22 (and therefore the lock core 14) is possible only when solenoid A2 is energized.

A second shoulder 31 is provided on cam 22 to prevent clockwise rotation (Fig. 7) of the cam if the solenoid A2 is deenergized after rotation of the cam in a counterclockwise direction has been started.

Solenoid A2 is normally energized through the circuit: Ground, relay K5 section 2 open, A2 coil S2C closed, S2B closed, S2A closed, K2B section 1 open, A.C. bus.

It will be noted that each cabinet is provided with a limit switch S2 which is closed when the cabinet is closed (Fig. 5). This provides a means for insuring that all cabinets are closed when not in use. In addition, it will be noted that relay K5 opens and closes instantaneously and, when energized, provides a means for deenergizing the key interlock A2.

When the holding alarm relay K2 is energized through K2A section 2 closed, power is removed from the interlock solenoid A2 at K2B section 1. Thus, upon closing the switch CS1 by use of the key 01110 the core 14 cannot be rotated back and the key is therefore trapped because the tumbler pin sections are out of alignment.

A single pole single throw normally closed switch S1 is provided in the circuit of section 1 of the alarm holding relay K2A which permits the system custodian to manually open the holding circuit and deenergize the key monitor. This automatically deenergizes the alarm AL1, returns the system to normal operation, and the key can be removed from the system.

As can be seen from an examination of the wiring diagram, Fig. 2, the operation of each key monitor switch bay is identical and grounding is applied from parallel circuits to K1A section 1. Therefore to extend the key monitor bays to take care of any given number of lost keys, it is only necessary to add switch bays (as shown, S9 through S13 inclusive) and additional sections to the multiple section relays K8 through K12 inclusive.

It should be noted that the system provides key retention whenever a cabinet is open, in order to insure that a cabinet will not be left open while unattended by a customer or subscriber on whom responsibility may be placed. Should any customer leave the system open, it can only be with his consent and any charges made in this condition are charged to his code.

The above is accomplished by breaking the actuation current to the key holding interlock solenoid A2 at the door limit switches S2. This can only occur during normal operation since the lock release solenoids must be operative before the doors can be opened. Upon the closing of all the cabinet doors, the interlock solenoid A2 is reenergized and the key can be turned and removed; thereby closing the system.

Power off interlocks

Protection of the systems during power failures, and even momentary interruptions, is provided for.

A battery B1 is provided (Fig. 1) which is connected to instantaneously acting relay K5 through intantaneously acting relay K4 and delayed opening relay KD3 and ground. The battery is also connected across alarm AL2 by section 2 of relay K5 when the latter is energized.

When the system is open under normal operation and power is on, power off alarm relays K3 and KD3 are energized and closed through circuits: Ground, K3 coil, door limit switches S2 open, K2B section 1 open, A.C. bus.; and: Ground, K3 closed, KD3 coil, D.C. bus. The alarm relay K4 is continually energized when power is on.

Should power fail under the above conditions, all relays become deenergized. However, KD3 does not immediately open but remains closed for one unit of time. During this unit of time, the holding relay K5 becomes energized from the standby battery pack through the circuit: Ground, KD3 closed, K4 open, K5 coil, B1.

Simultaneously, K5 is held closed through the holding circuit: Ground, S3 closed, K5 section 1 closed, K5 coil, B1; and the alarm AL2 is energized through circuit: Ground, K5 section 2 closed, AL2 coil, B1.

The system remains in this alarm condition even after the power has been restored, and interlock solenoid A2 is deenergized thus retaining the customer's key. A local alarm may inform the customer of the power failure.

A single pole single throw normally closed switch S3 is provided in the ground of relay K5 section 1 for breaking the holding circuit of K5 as soon as the custodian can check the charges made by the customer. This returns the system to normal operation. The reset switch S3 may be placed at a remote point and accessible only to the custodian.

As pointed out above, the herein described specific illustration of the invention is not to be taken as restrictive thereof by one of various forms which it may take without departing from the spirit of the appended claims.

It is desired to emphasize that a key is not the only means for registering the desired code. Another means might be a non-conducting card, through which conducting circuits are established according to a two dimensional space matrix. The only important requirement is that the end result of the coding be the opening or closing of electrical switches.

Another alternative might be the use of card having transparent and opaque sections used in conjunction with a photoelectric optical reading system.

It will be apparent that the only requirements to be satisfied for all coding methods are the use of two separate codes (which must be satisfied simultaneously) and a physical holding mechanism of whatever type for key retention. In the illustrative example given above, one code is provided by the position of the insulated sections in the pin tumblers and the other is the actual physical lengths of the pin sections permitting the core of the lock cylinder to be turned—and also the shape of the key.

It will be understood that various modifications may be made without departing from the present invention. For example, instead of applying data to the paper strip of a printing machine, the invention contemplates the use of a standard key punch and its associated punch card and the like for recording and retaining the pertinent information.

Insofar as alternative coding methods are concerned it will be apparent that a card may be employed on which ferromagnetic material may be deposited on certain areas so that such areas cooperate with the air gaps in the cores of a plurality of inductors in a manner to provide a magnetic or inductive reading system.

On the other hand, the above mentioned areas may be overlaid with non-conducting material so as to form a capacitive reading system in conjunction with a plurality of capacitive elements.

In an analogous manner, either ferromagnetic or conductive matrices may be established so that certain areas correspond to the position of a plurality of coils forming a portion of a radio frequency detection and reading system.

I claim:

1. In a charging system including a plurality of locked articles each having one of two conditions and a lock adapted to be unlocked by means of a key, a key for so unlocking the lock of any one of said articles and provided with coding means designating the user thereof, means responsive to said coding means as a key is used to unlock said articles, first registering means operated in response to said means responsive to said coding means for registering the code corresponding to said key at a central point remote from said articles when one of said articles is unlocked, second registering means at said point, and means responsive to the condition of said articles for operating said second registering means to register one or the other of said conditions.

2. In a charging system including a plurality of locked articles each having one of two conditions and a lock adapted to be unlocked by means of a key, a key for so unlocking the lock of any one of said articles and provided with coding means designating the user thereof, means responsive to said coding means as a key is used to unlock said articles, first registering means operated in response to said means responsive to the coding means for registering the code corresponding to said key at a central point remote from said articles when one of the articles is unlocked, second registering means at said point, means responsive to the condition of said articles for operating said second registering means to register one or the other of said conditions, printing means actuated by a change in said conditon for printing responsive to said two registering means indica corresponding to said code and said change of condition.

3. In a charging system including a plurality of locked articles each having one of two conditons and a lock adapted to be unlocked by means of a key, means responsive to said two conditions a key for so unlocking the lock of any one of said articles and provided with coding means designating the user thereof, means responsive to said coding means as a key unlocks said articles, first registering means actuated by said code responsive means for registering the code corresponding to said key at a central point remote from said articles when one of said articles is unlocked, second registering means at said point actuated by said means responsive to the condition of said articles for registering one or the other of said conditions, and means including a plurality of switches adapted to be manually set to correspond to said code for preventing withdrawal of a certain key corresponding to said code when said certain key is inserted in the lock of one of said articles and said switches are so set.

4. In a charging system including a plurality of locked articles each having one of two conditions and a lock adapted to be unlocked by means of a key, means responsive to said two conditions, a key for so unlocking the lock of any one of said articles and provided with coding means designating the user thereof, means responsive to said code as a key unlocks the locks, first registering means operated by said code responsive means for registering the code corresponding to the key at a central point remote from said articles when one of said articles is unlocked, and second registering means at said point actuated by said means responsive to the condition of said articles for registering one or the other of said conditions, said coding means including a plurality of indentations arranged along the length of said key and said means responsive to said coding including spring urged pins adapted to engage said indentations when said key is inserted in said lock, said pins being composed of separable sections and one of the sections of each of said pins being of an insulated material.

5. In a charging system including a plurality of locked articles each having one of two conditions and a lock adapted to be unlocked by means of key, means responsive to said two conditions, a key for so unlocking the lock of any one of said articles and provided with coding means designating the user thereof, means responsive to said code as a key unlocks said locks, first registering means operated by said code responsive means for registering the code corresponding to the key at a central point remote from said articles when one of said articles is unlocked, and second registering means at said point actuated by said means responsive to the condition of said articles for registering one or the other of said conditions, said coding means including a plurality of indentations arranged along the length of said key and said means responsive to said code including spring urged pins adapted to engage said indentations when said key is inserted in said lock, said pins being composed of separable sections and one of the sections of each of said pins being of an insulated material, and means for completing circuits through said pins depending upon the position of said insulated sections.

6. In a charging system including a plurality of items being at one time in one of two conditions, means for charging to a person responsibility for one of said conditions comprising: a coded element having a code designating the user thereof, means actuated by the position of said items for changing said conditions from one to the other and operable through the use of said coded element, means responsive to said code, registering means operated by said code responsive means for registering said code at a central point remote from said items when said condition is changed, a source of electrical power for activating said means, a locking device for preventing said change in condition and adapted to be unlocked by the use of said coded element, and means for locking said device independently of the use of said element when said source is deenergized.

7. In a charging system including a plurality of locked articles each having one of two conditions and a lock adapted to be unlocked by means of key, means responsive to said two conditions, a key for so unlocking the lock of any one of said articles and provided with coding means designating the user thereof, means responsive to said coding means, first registering means operated by said code responsive means for registering the code corresponding to a key at a central point remote from said articles when one of said articles is unlocked, and second registering means at said point operated by said means responsive to the condition of said articles for registering one or the other of said conditions, said coding means including a plurality of indentations arranged along the length of said key and said means responsive to said coding means including spring urged pins adapted to engage said indentations when said key is inserted in said lock, said pins being composed of separable sections and one of the sections of each of said pins being of an insulated material, means for completing circuits through said pins depending upon the position of said insulated sections, and separate locking means including a solenoid for locking said articles when the power supply to said system is interrupted.

References Cited in the file of this patent
UNITED STATES PATENTS

| | | |
|---|---|---|
| Re. 17,797 | Chase et al. | Sept. 16, 1930 |
| 1,390,017 | Bryce | Sept. 6, 1921 |
| 1,816,887 | Adams | Aug. 4, 1931 |
| 1,969,978 | Hanel | Aug. 14, 1934 |
| 2,032,037 | Auth | Feb. 25, 1936 |
| 2,105,304 | Wagner | Jan. 11, 1938 |
| 2,124,160 | Wheelock | July 19, 1938 |
| 2,172,511 | Johnson et al. | Sept. 12, 1939 |
| 2,276,293 | Farmer | Mar. 17, 1942 |
| 2,330,358 | Johnson | Sept. 28, 1943 |
| 2,344,234 | Cooper | Mar. 14, 1944 |
| 2,345,136 | Lomax | Mar. 28, 1944 |
| 2,353,002 | Armbruster | July 4, 1944 |
| 2,376,846 | Field et al. | May 22, 1945 |
| 2,602,116 | Skillman | July 1, 1952 |
| 2,677,814 | Miller | May 4, 1954 |
| 2,714,201 | Whitehead | July 26, 1955 |